(No Model.) 3 Sheets—Sheet 1.

C. H. REID.
MACHINE FOR ROUNDING AND PLANING THE CURLED EDGES OF HATS.

No. 427,793. Patented May 13, 1890.

Witnesses
S. S. Williamson
W. J. Haviland

Inventor
Charles H. Reid
By Smith and Hubbard
Attys.

(No Model.) 3 Sheets—Sheet 2.
C. H. REID.
MACHINE FOR ROUNDING AND PLANING THE CURLED EDGES OF HATS.
No. 427,793. Patented May 13, 1890.
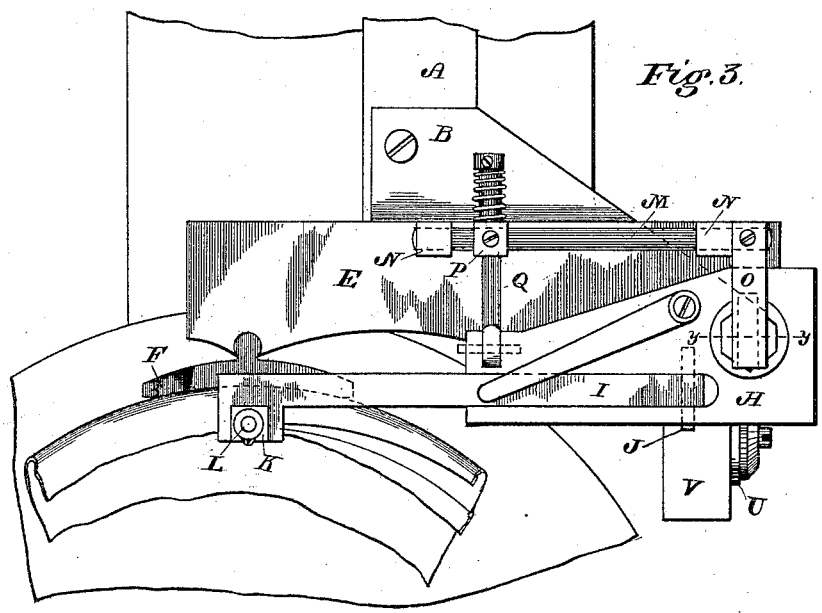
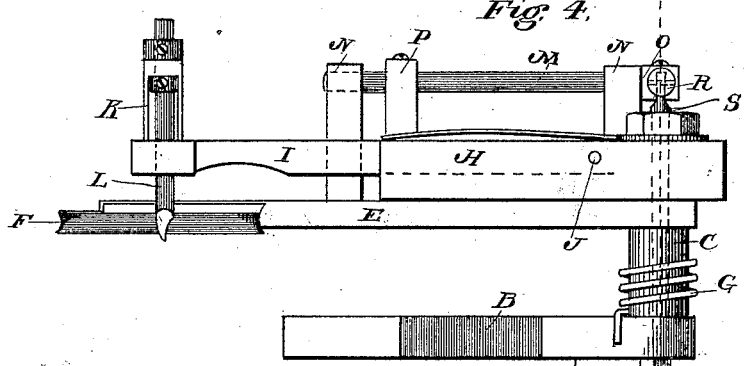
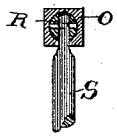
Witnesses
S. S. Williamson
W. T. Fairfand
Inventor
Charles H. Reid
By Smith and Hubbard
Attys.

(No Model.) 3 Sheets—Sheet 3.
C. H. REID.
MACHINE FOR ROUNDING AND PLANING THE CURLED EDGES OF HATS.

No. 427,793. Patented May 13, 1890.

Witnesses
S. S. Williamson
W. J. Haviland

Inventor
Charles H. Reid
By Smith and Hubbard
Attys.

UNITED STATES PATENT OFFICE.

CHARLES H. REID, OF DANBURY, CONNECTICUT.

MACHINE FOR ROUNDING AND PLANING THE CURLED EDGES OF HATS.

SPECIFICATION forming part of Letters Patent No. 427,793, dated May 13, 1890.

Application filed November 2, 1887. Renewed February 17, 1890. Serial No. 340,702. (No model.)

*To all whom it may concern:*

Be it known that I, CHARLES H. REID, a citizen of the United States, residing at Danbury, in the county of Fairfield and State of Connecticut, have invented certain new and useful Improvements in Hat-Manufacturing Machines; and I do hereby declare the following to be a full, clear, and exact description of the invention, such as will enable others skilled in the art to which it appertains to make and use the same.

My invention relates to certain new and useful improvements in machines for rounding and planing the curled edges of hats, and is intended as an improvement on the construction shown and described in Letters Patent No. 301,278, granted to me July 1, 1884, and Letters Patent No. 292,356, granted to me on the 22d day of January, 1884, the object of my present construction being to provide positive and effective means for determining the line of travel of the cutting-tool relative to the curled edge of the hat-brim, thus insuring the uniform rounding of any number of hats in respect to the inner or trimmed edge without regard to the outer or curled edge.

With these ends in view my invention consists in the details of construction and combination of elements hereinafter fully set forth, and then specifically designated by the claims.

In order that those skilled in the art to which my invention appertains may fully understand how to make and use the same, I will proceed to describe it in detail, referring by letter to the accompanying drawings, forming a part of this specification, in which—

Figure 1:
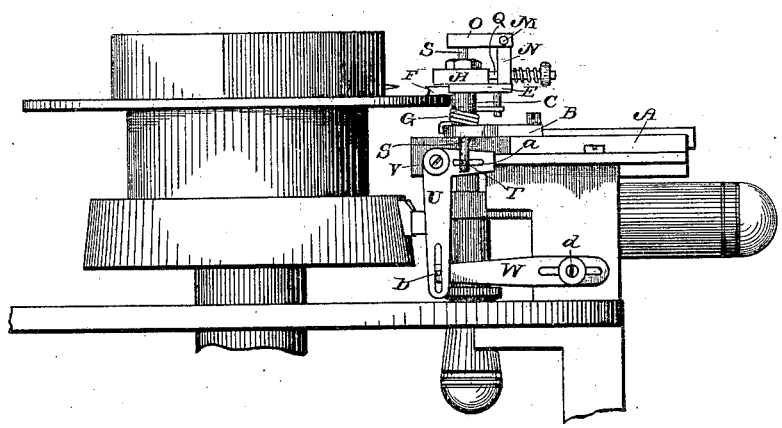
Figure 2:
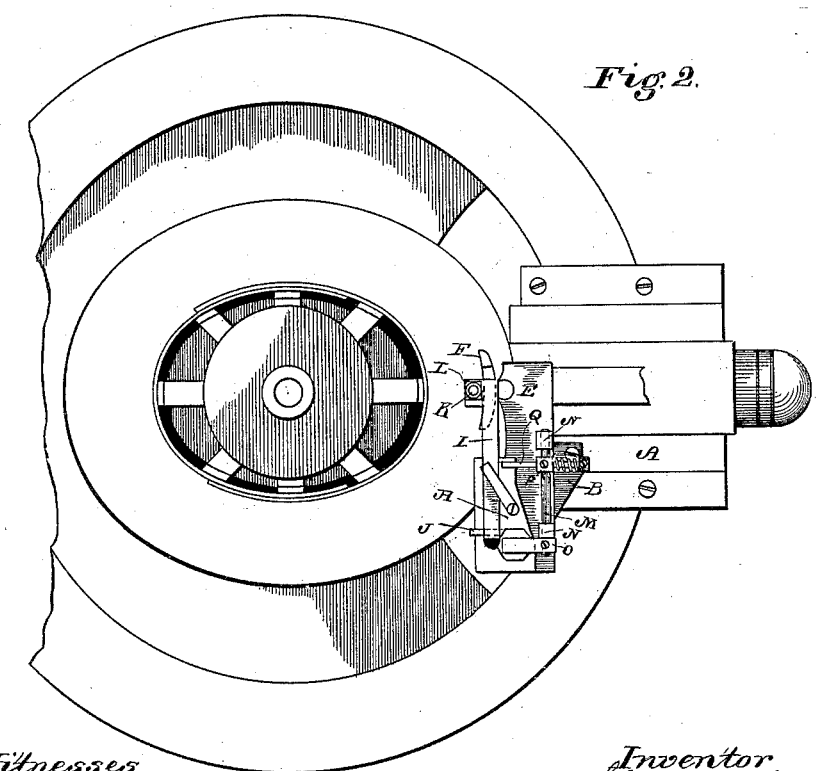
Figure 7:
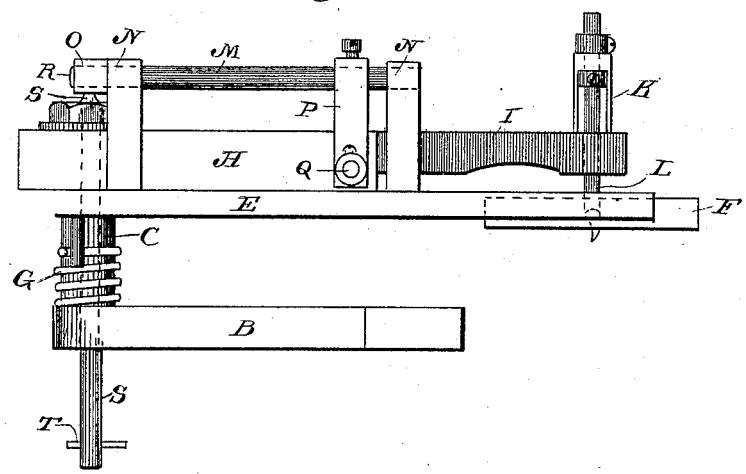
Figure 8:
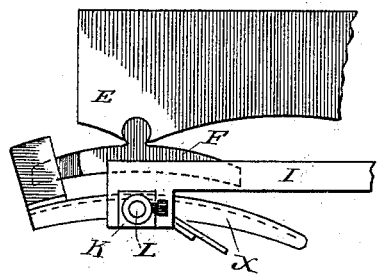
Figure 9:
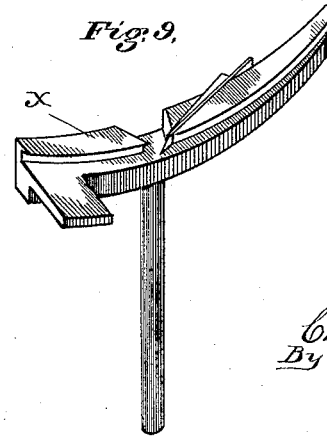

Figure 1 is a side elevation of a part of the machine shown in the patent above referred to, with my present improvement attached thereto; Fig. 2, a plan view of the same; Fig. 3, an enlarged plan showing the trimming-tool in operation; Fig. 4, a detached front elevation of my present improvement; Fig. 5, a section at the line $xx$ of Fig. 4; Fig. 6, a similar view at the line $yy$ of Fig. 3; Fig. 7, a rear view similar to Fig. 4; Fig. 8, a detail plan of the tool-holder having therein a planer, and Fig. 9 a detail perspective of the planer.

Similar letters denote like parts in all the figures of the drawings.

It is not deemed necessary to enter into any detailed description of the machine proper, as the construction and operation of the same are fully shown and described in Letters Patent No. 292,356 aforesaid, reference being had only to such parts of said machine as effect the operation of my present attachment.

A is the slide, to which movement is imparted by the templet in the same manner described into the last referred-to patent. To this slide is secured the bracket B, the function of which is to support the operative parts of the attachment.

Projecting upward from the outer extremity of the bracket is a hollow post C, whose upper half is of smaller diameter, so as to form a bearing for the sleeve D, which is formed with the shoe-bar E. This shoe-bar extends inward to the longitudinal center of the slide, and has swiveled thereto a shoe F, which is adapted to bear against the curled edge of a hat-brim by reason of the action of a spring G, coiled about the post, the free ends of this spring bearing, respectively, against the bracket and a pin projecting from the shoe-bar. Thus it will be seen that as the hat revolves the shoe-bar will be caused to swing back and forth, the post forming its pivotal point.

H is the tool-bar carrier, the outer end of which is pivoted around the sleeve D, and I is a tool-bar, which is hinged within a slot in the carrier by means of the pin J. Formed with the inner end of the tool-bar is a holder K, in which is secured a cutting-tool L by means of suitable collars and set-screws.

M is a rock-shaft supported in bearings N, projecting from the shoe-bar, and O P are arms secured to said shaft, the former extending horizontally over the upper end of the post C and the latter extending downward and connected by means of the rod Q to the tool-bar carrier, so that any movement of the rock-shaft will be imparted to said carrier.

R is a plug sliding freely within a recess formed in the horizontal arm O, and pivoted to this plug is a rod S, which extends downward through the post C, the outer end of this rod being provided with a pin T for the purpose presently explained.

U is a bell-crank lever pivoted to a block V, depending from the bracket. The horizontal arm of this lever is slotted at $a$ to receive the pin T, and the vertical arm is also slotted to receive a pin $b$, projecting from an adjustable bar $w$, which is secured to the frame of the machine at $d$.

As before described, the shoe-bar has a swinging movement imparted to it by the hat-brim independent of the back-and-forth movement received from the templet through the slide, and the tool-carrier is carried by said bar in both the movements of the latter, and it follows that the cut of the tool would remain the same distance from the curled edge of the brim if the said tool had no other movement imparted thereto, thus leaving the completed curl the same width throughout; but as the width or flange of the curl must be varied the distance between the shoe and cutting-tool must increase and diminish independent of the already-described back-and-forth and swinging movements of the shoe-bar and tool-carrier. Now, as movement is imparted to the slide from the templet and the bracket carrying the several parts of the attachment moves back and forth, as above described, the lower end of the lever U is prevented from moving by the pin $d$, and it follows that the upper end of said lever is caused to rise and fall synchronously with the back-and-forth movement of the bracket, thus effecting an up-and-down movement of the rod S, which in turn will oscillate the rock-shaft and swing the tool-carrier back and forth, thus increasing and diminishing the distance between the shoe and cutting-tool, and thereby determining the varying width of the completed curl. This independent movement of the cutting-tool may be determined and adjusted, first, by the horizontal plane of the templet with respect to the shoe from which the movement of the slide is taken, and, second, by the position of the pin $b$ within the slotted lever U, which latter is determined by the proper adjustment of the bar W.

From the foregoing it will be seen that any shape of curl may be uniformly trimmed to correspond with the outer contour of the curled edge of the brim, and that all hats so rounded or trimmed on the same adjustment of the machine will have like flanges at the inner edge of the curl, and this is a most desirable result in hat curling and rounding. In some instances it is necessary to plane the rounded or trimmed edge of the curl, and this may be accomplished by simply removing the cutting-tool and substituting in its stead the planer X, (shown in Figs. 8 and 9,) when by causing the hat to revolve the rounded edge will be evenly planed.

If desired, the blade of the cutting-tool may be caused to automatically preserve a tangential position relative to the varying curves desired to the rounded edge by means of a lever-connection with the "oscillating tool-carrier" of the machine proper, as described in my former patents, above referred to.

Having thus fully described my invention, what I claim as new and useful is—

1. In a hat-brim rounding or trimming machine, a bar receiving a back-and-forth movement from the templet of the machine and adapted to be swung on its pivotal point by the contour of the outer edge of the hat-brim, in combination with a tool-carrier carried by said bar in both its movements and adapted to vary the distance between the tool and the shoe on the bar, whereby a variable line of travel is described by the tool, as specified.

2. In combination with a hat-rounding machine of the character described, a bar carried by the reciprocating slide of said machine and provided with a shoe adapted to bear against the outer curled edge of the hat-brim, whereby an independent swinging movement is given to said bar, and a tool-carrier pivoted to the bar and adapted to have a movement independent thereof, said movement being brought about by the reciprocation of the slide, as shown, and for the purpose of varying the line of cut of the tool, as described.

3. In combination with the reciprocating slide of a hat-brim-rounding machine, a bracket carried thereby, said bracket having pivoted thereto a spring-actuated bar, to the free end of which is pivoted a shoe adapted to bear against the curled edge of the brim, and thereby impart movement to the said bar against the action of its spring, and a tool-carrier pivoted to the bar concentric with the pivotal point of the latter, said carrier being provided with a tool-holder at its free end and adapted to receive a swinging movement from the bell-crank lever through the rock-shaft, as and for the purpose set forth.

4. In combination with a hat-rounding machine of the character described, the bracket secured to and carried by the reciprocating slide of said machine, the post C, projecting from said bracket, the spring-actuated bar pivoted to the post and carrying a shoe for contact with the curled edge of the hat-brim, a rock-shaft supported by said bar, a tool-carrier pivoted to the bar and connected to the rock-shaft, a tool-holder formed with the free end of the carrier and adapted to carry the tool, the bell-crank lever, the rod S, for connecting said lever and the rock-shaft, and means for securing the lower end of the bell-crank as against longitudinal movement, all combined in the manner shown, and for the purpose specified.

5. In a machine for trimming the curled edges of hat-brims, the trimming-tool adapted to receive a variable movement by means of intermediate connection with the templet, whereby the inner edge of the curled brim is trimmed at the varying widths desired, in combination with means, as a pivoted shoe, carried by the cutter-frame and having a constant bearing against the outer edge of the brim, whereby the imperfections of said outer edge are followed by the trimming-tool independent of the templet, substantially as set forth.

6. In a machine for trimming the curled edges of hat-brims, the combination, with a slide adapted to receive a variable motion from the templet, and the spring-actuated shoe-bar pivoted to said slide and having at the inner end thereof a shoe adapted to have a constant bearing against the outer edge of the curled brim, of the tool-bar carrier superimposed upon and pivoted to said shoe-bar, the tool-bar secured within said carrier, the trimming-tool mounted in the end of said bar, a rock-shaft mounted in bearings projecting from the shoe-bar, a connecting-link through which motion is transmitted from said rock-shaft to the carrier, a bell-crank lever pivoted to the slide and secured at its lower extremity to the frame of the machine, and a rod depending from the rock-shaft crank and attached to the upper end of said bell-crank, substantially as and for the purposes set forth.

In testimony whereof I affix my signature in presence of two witnesses.

CHARLES H. REID.

Witnesses:
 S. H. HUBBARD,
 S. S. WILLIAMSON.